United States Patent
Erb et al.

(10) Patent No.: US 8,041,055 B2
(45) Date of Patent: Oct. 18, 2011

(54) METHOD AND APPARATUS FOR AUTOMATICALLY ADJUSTING REMINDER VOLUME ON A MOBILE COMMUNICATION DEVICE

(75) Inventors: Paul Andrew Erb, Ottawa (CA); Dieter Schulz, Dunrobin (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1162 days.

(21) Appl. No.: 11/686,606

(22) Filed: Mar. 15, 2007

(65) Prior Publication Data

US 2008/0227407 A1 Sep. 18, 2008

(51) Int. Cl.
*H03G 3/00* (2006.01)
(52) U.S. Cl. ............ 381/108; 381/83; 381/93; 381/96; 381/107; 381/104; 455/567
(58) Field of Classification Search .............. 381/93, 381/96, 104, 109, 83, 107–108; 455/567, 455/569.1, 575.1; 379/406.01–406.06
See application file for complete search history.

(56) References Cited

U.S. PATENT DOCUMENTS

| | | | |
|---|---|---|---|
| 2003/0039352 A1* | 2/2003 | Joncour et al. | 379/390.01 |
| 2006/0083388 A1* | 4/2006 | Rothschild | 381/81 |

FOREIGN PATENT DOCUMENTS

| | | |
|---|---|---|
| DE | 10039211 A1 | 2/2002 |
| EP | 1047258 A2 | 10/2000 |
| EP | 1278360 A1 | 1/2003 |
| WO | WO 99/05850 A1 | 2/1999 |

* cited by examiner

*Primary Examiner* — Devona Faulk
*Assistant Examiner* — Disler Paul

(57) ABSTRACT

A method and apparatus for automatically adjusting volume of an audio signal on a mobile device, comprising playing the audio signal at an initial volume, sampling the audio signal, estimating a transfer function based on an echo path characteristic between the played audio signal and sampled audio signal, selecting a volume policy based on the estimated transfer function, and adjusting the volume of the audio signal in accordance with the selected volume policy.

12 Claims, 2 Drawing Sheets

METHOD AND APPARATUS FOR AUTOMATICALLY ADJUSTING REMINDER VOLUME ON A MOBILE COMMUNICATION DEVICE

BACKGROUND OF THE INVENTION

1. Field of the Invention

The present invention is directed to mobile devices, and more particularly to automatically adjusting the initial reminder volume in a mobile device based on acoustic environment.

2. Description of the Related Art

A well known function of mobile devices such as Personal Digital Assistants (PDAs) or Pocket PCs is the provision of a reminder for the user to perform a task, attend to a calendar event, etc. When a reminder is presented on a mobile device, the volume may be either too quiet to hear, such that the reminder passes unnoticed (particularly when in a pocket, purse, etc.) or too loud such that the reminder becomes an annoyance to other people in the vicinity of the user.

The problem has also been addressed somewhat in wireless telephony by the provision of a vibrate mode and/or downloadable ring tones.

Some users choose to play a wave file (.wav), rather than the default reminder sound. However, the selected wave file may also be either too loud or too soft depending on circumstance. Another approach is to periodically manually adjust the volume of the mobile device when changing its' location.

All of the foregoing approaches to solving this problem require the user to selectively adjust how the reminder or notification is presented. As a result, these solutions depend on forethought of where the device will be when a reminder occurs.

SUMMARY OF THE INVENTION

It is an aspect of the present invention to provide a method and apparatus for automatically setting the initial volume of a reminder/notification based on the "size" of the space occupied by the mobile device. Large spaces, such as within a room (e.g. when the mobile device is resting on a desk, docked in a phone appliance such as a 5230 IP phone manufactured by Mitel Networks Corporation, or held in a user's hand), require only a relatively quiet initial volume whereas small areas, such as inside a pocket or a purse, require a louder initial volume.

Therefore, according to an aspect of the invention the reminder/notification volume is periodically automatically adjusted while the alarm is playing, such that the alarm volume becomes quieter when the device is removed from a pocket or purse, without requiring any user action. Preferably, the default reminder/notification volume is restored after the reminder/notification has been acknowledged or otherwise ceases playing.

According to one embodiment, a play alarm "applet" is executed within the device for playing the alarm, sampling the sound via the device microphone, estimating the "size" of the space and adjusting the volume. This sequence is repeated until the alarm is acknowledged or ceases.

The above aspects can be attained by a method and apparatus for automatically adjusting volume of an audio signal on a mobile device, comprising playing the audio signal at an initial volume, sampling the audio signal, estimating a transfer function based on an echo path characteristic between the played audio signal and sampled audio signal, selecting a volume policy based on the estimated transfer function, and adjusting the volume of the audio signal in accordance with the selected volume policy.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
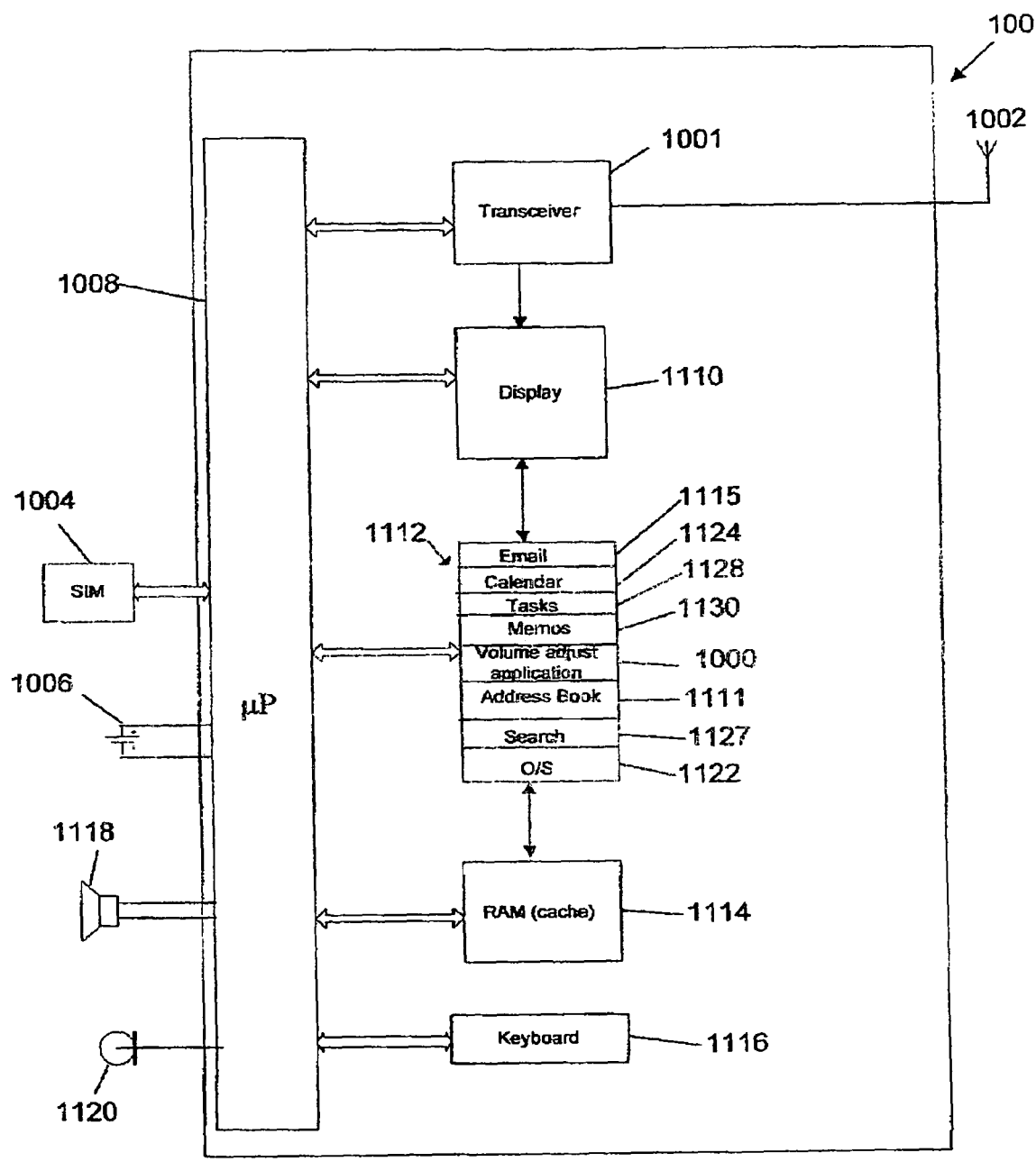
FIG. 1 is a block diagram of a mobile device in connection with which the invention may be implemented.

Turning to FIG. 1, a mobile device 100 is shown in the form of a two-way communication device having at least voice and advanced data communication capabilities, including the capability to communicate with other computer systems. Depending on the functionality provided by mobile device 100, it may be referred to as a data messaging device, a two-way pager, a cellular telephone with data messaging capabilities, a wireless Internet appliance, or a data communication device such as a PDA or Pocket PC (with or without telephony capabilities).

Mobile device 100 may incorporate a transceiver 1001, which includes a receiver, a transmitter, and associated components, such as an antenna 1002. As will be apparent to those skilled in the field of communications, particular design of transceiver 1001 depends on the communication network in which the mobile device 100 is intended to operate.

Mobile device 100 may send and receive communication signals over the network after required network registration or activation procedures have been completed. Signals received by antenna 1002 through the network are input to transceiver 1001, which may perform such common receiver functions as signal amplification, frequency down conversion, filtering, channel selection, analog-to-digital (A/D) conversion, and the like. A/D conversion of a received signal allows more complex communication functions such as demodulation and decoding to be performed. In a similar manner, signals to be transmitted are processed, including modulation and encoding, for example via a Digital Signal Processor (not shown). These DSP-processed signals are input to transceiver 1001 for digital to analog (D/A) conversion, filtering, amplification and transmission over communication network via antenna 1002.

Network access is associated with a subscriber or user of a mobile device 100, and therefore mobile device 100 requires a Subscriber Identity Module or "SIM" card 1004 to be inserted in a SIM interface (not shown) in order to operate in the network. Mobile device 100 is a battery-powered device so it also includes a battery interface for receiving one or more rechargeable batteries 1006. Such a battery 1006 provides electrical power to most if not all electrical circuitry in mobile device 100, and the battery interface (not shown) provides for a mechanical and electrical connection.

Mobile device 100 includes a microprocessor 1008 which controls overall operation. Communication functions, including at least data and voice communications, are performed through transceiver 1001. Microprocessor 1008 also interacts with additional device subsystems such as a display 1110, a flash memory 1112, a random access memory (RAM) 1114, a keyboard 1116, a speaker 1118, a microphone 1120, and any other device subsystems that may be desirable such as auxiliary input/output (I/O) subsystems, serial port, and/or short-range communications.

Operating system software 1122 used by microprocessor 1008 is preferably stored in a persistent store such as flash memory 1112, which may alternatively be a read-only memory (ROM) or similar storage element. Those skilled in the art will appreciate that the operating system, specific device applications, or parts thereof, may be temporarily loaded into a volatile store such as RAM 1114.

Microprocessor 1008, in addition to its operating system functions, preferably enables execution of software applications on mobile communication device 100. A predetermined set of applications which control basic device operations, including for example data and voice communication applications, will normally be installed on mobile device 100 during its manufacture. A preferred application that may be loaded onto mobile device 100 may be a personal information manager (PIM) application having the ability to organize and manage data items relating to the user such as, but not limited to, e-mail, calendar events, voice mails, appointments, and task items. Naturally, one or more memory stores are available on mobile device 100 and SIM 1004 to facilitate storage of PIM data items and other information.

As discussed above, memory 1112 includes a plurality of applications or routines (associated with visually displayed icons) for the processing of data. These applications may be in any of a variety of forms such as, without limitation, software, firmware, and the like, including, for example, an e-mail application 1115, a calendar application 1124, an address book application 1111, a tasks application 1128, a memo application 1130, and a search application 1127. An operating system (OS) program 1122 also resides in memory 1112.

Figure 2:
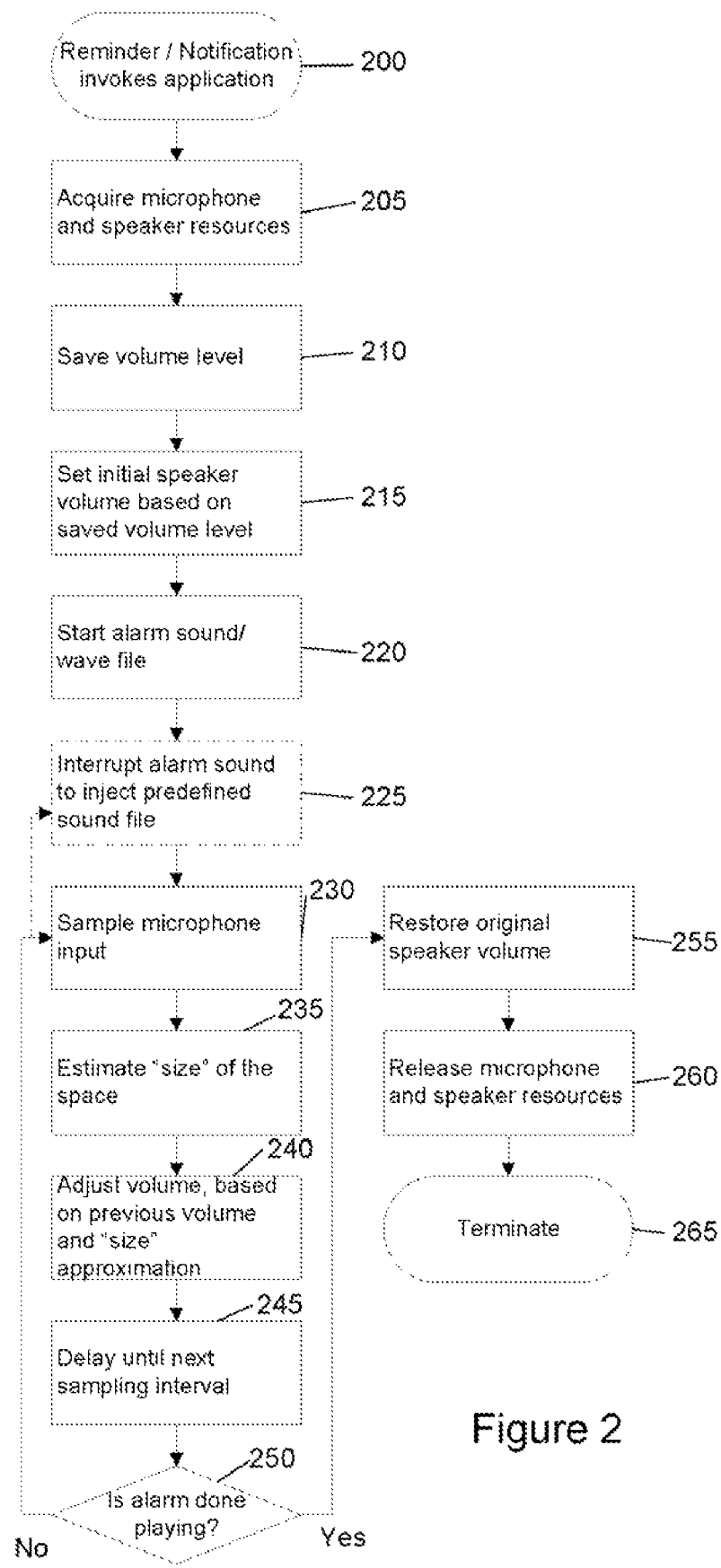
FIG. 2 is a flowchart showing a method for automatically adjusting the initial reminder volume in a mobile device, according to an exemplary embodiment of the invention.

One or more of the software applications, such as calendar application 1124 and tasks application 1128, may be programmed by the user to generate an audible reminder of, for example, a calendar event or task to be performed. FIG. 2 shows method steps, according to an exemplary application 1000 of the present invention, for automatically adjusting the volume of such reminders to ensure audibility of the reminder while minimizing disruptions to others in the vicinity of the user. Preferably, application 1000 is implemented as a software applet that is spawned in response to activation of a reminder or notification by another application (e.g. calendar application 1124, tasks application 1128, etc.)

Thus, when a reminder/notification is activated (e.g. due to a calendar or tasks event), the volume adjust application 1000 is invoked (applet spawned). First, microphone and speaker resources are acquired (step 205), the current "voice" volume is saved (step 210), the initial "alarm" volume for speaker 1118 is set based on the saved "voice" volume (step 215) and a wave file or the default reminder sound is played (step 220). The sound starts playing at a relatively quiet volume and is sampled via microphone 1120 (step 230). As discussed in greater detail below, by using DSP resources available in the application 1000, an approximation of echo is evaluated based on the speaker output and microphone input signals.

To improve the estimate of "size" of the space, application 1000 may play a predefined sound file on the speaker 1118 in addition to or instead of using the reminder sound (white sampling the microphone input 1120), as indicated by stippled lines (step 225). When used in combination, the specialized sound interrupts the normal sound for brief intervals, optionally at a lower volume, to minimize noticeable disruption of the desired reminder sound.

The "size" of the space is estimated from the echo path characteristic between the speaker 1118 and microphone 1120. When the device is in a pocket, for example, the transfer function between the speaker and microphone differs from the transfer function between the speaker and microphone when the device is held or sitting on a desk for a particular implementation (e.g. dependent on such criteria as relative placement of the microphone and speaker, plastics, enclosure design, etc.) By characterizing the device in different situations, a profile can be determined when the device is in "free space" (low volume required) or in "closed space" (high volume required). Templates of the transfer function for the different situations may be captured and pre-stored in the device. Each such template has a volume policy associated with it. During operation, when the alarm is played, the transfer function is estimated by comparing the played-out reference signal to the measured echo signal (step 235). The measured transfer function is compared with the internal stored templates, the closest matching template is selected, and an increase or decrease in volume is applied to the sound through the speaker based on the volume policy associated with the selected template (step 240).

This sampling of acoustics and adjustment of volume is repeated at intervals (step 245) until the sound completes playing (step 250). The intervals may be short (e.g. tenths of seconds) or longer (e.g. seconds) depending on the capability of the device or the preference of the user.

Upon completion of the sound playing, the application 1000 restores the original volume setting on the device (step 255) based on the voice volume saved at step 210, releases microphone and speaker resources (step 260), and terminates (step 265).

An alternative approach to estimating the "size" of the space and selecting a corresponding volume policy may be based on the differences in the transfer function (such as differences in received echo signal power, differences in correlation between the reference signal and echo signal and other statistical parameters). For example, the alarm signal may be compared with the microphone signal to generate a transfer function. Based on knowledge of the behavior when tested In the different scenarios, certain trends in the transfer function may be noted.

In addition to the PDA application set forth herein, the principles of the present invention can be applied to cellular/wireless phones, laptop PCs, and any other suitable electronic device that has a speaker, a microphone and computing capability. Also, the principles of the invention can be applied to other features where automatic adjustment of playback volume is desirable (in changing acoustic conditions). For example, the method and apparatus of the invention can be applied to setting the audio volume of any audio signal on a mobile device, such as increasing or decreasing the ringer volume of a cellular phone to compensate for background noise (e.g. in a restaurant or on a busy street). Similarly, the method and apparatus of the invention may be applied to automatic adjustment of playback volume on an mp3 player.

The application 1000 may be implemented as an applet or other alternative mechanism for initiating automatic adjustment of volume.

The many features and advantages of the invention are apparent from the detailed specification and, thus, it is intended by the appended claims to cover all such features and advantages of the invention that fall within the true sphere and scope of the invention. Further, since numerous modifications and changes will readily occur to those skilled in the art it is not desired to limit the invention to the exact construction and operation illustrated and described and accordingly all suitable modifications and equivalents may be resorted to, falling within the scope of the invention.

What is claimed is:

1. A method of automatically adjusting volume of an audio signal generated by an electronic device, the device comprising a speaker and a microphone, the method comprising:
   determining a plurality of transfer functions between the speaker and the microphone for a plurality of acoustic environments;
   storing, in a memory of the device, the plurality of transfer functions as a plurality of templates representing the respective acoustic environments, each of said stored templates having an associated volume policy:
   saving a current volume selling in a memory of the device;
   playing said audio signal at the current volume;
   estimating a current transfer function based on an echo path characteristic of the played audio signal at the current volume;
   comparing the current transfer function with the stored templates to find the stored template that is a closest match to the current transfer function;
   selecting the closest matched stored template;
   adjusting the volume of said audio signal in accordance with said associated volume policy of the closest matched stored template and playing said audio signal at an adjusted volume; and
   restoring the device to the current volume setting.

2. A method as claimed in claim 1, wherein said audio signal is an audible reminder signal.

3. A method as claimed in claim 1, wherein said audio signal is a predefined sound played in addition to an audible reminder signal.

4. A method as claimed in claim 3, wherein said audio signal is a predefined sound that periodically interrupts playing of said audible reminder signal.

5. A method as claimed in claim 1, wherein said volume is one of either increased in the event said transfer function indicates that said electronic device is in a closed acoustic space or decreased in the said transfer function indicates that said electronic device is in an open acoustic space.

6. A method as claimed in claim 1, wherein said playing, sampling, estimating, selecting and adjusting are repeated at predetermined intervals.

7. An electronic device with automatically adjustable volume, comprising:
   a speaker for playing an audio signal at a current volume;
   a memory for storing the current volume setting and additional memory for storing a plurality of templates comprising transfer functions representing a plurality of acoustic environments, each of said stored templates having an associated volume policy:
   a microphone for sampling said audio signal; and
   a processor configured for:
   determining a plurality of transfer functions between the speaker and the microphone representing the plurality of acoustic environments;
   estimating a current transfer function based on an echo path characteristic of the played audio signal at the current volume;
   comparing the current transfer function with the stored templates to find the stored template that is a closest match to the current transfer function;
   selecting the closest matched stored template;
   adjusting the volume of said audio signal in accordance with said associated volume policy of the closest matched stored template and causing said audio signal to play at an adjusted volume; and
   restoring the device to the current volume setting.

8. An electronic device as claimed in claim 7, wherein said audio signal is an audible reminder signal.

9. An electronic device as claimed in claim 7, wherein said audio signal is a predefined sound prayed in addition to an audible reminder signal.

10. An electronic device as claimed in claim 9, wherein said audio signal is a predefined sound that periodically interrupts playing of said audible reminder signal.

11. An electronic device as claimed in claim 7, wherein said processor increases the volume of said audio signal in the event said transfer function indicates that said electronic device is in a closed acoustic space and decreases the volume of said audio signal in the event said transfer function indicates that said electronic device is in an open acoustic space.

12. An electronic device as claimed in claim 7, wherein said processor, repeats said playing, sampling, estimating, selecting and adjusting at predetermined intervals.

* * * * *